US009364918B2

(12) United States Patent
Yoshida et al.

(10) Patent No.: US 9,364,918 B2
(45) Date of Patent: Jun. 14, 2016

(54) ALUMINUM ALLOY PROPELLER SHAFT AND FRICTION WELDING PROCESS THEREOF

(71) Applicant: Hitachi Automotive Systems Kyushu, Ltd., Chikujo-gun, Fukuoka (JP)

(72) Inventors: Keigo Yoshida, Atsugi (JP); Kazuya Matsumoto, Buzen (JP)

(73) Assignee: Hitachi Automotive Systems Kyushu, Ltd., Fukuka (JP)

( * ) Notice: Subject to any disclaimer, the term of this patent is extended or adjusted under 35 U.S.C. 154(b) by 0 days.

(21) Appl. No.: 14/642,208

(22) Filed: Mar. 9, 2015

(65) Prior Publication Data

US 2015/0174696 A1    Jun. 25, 2015

Related U.S. Application Data

(62) Division of application No. 13/939,424, filed on Jul. 11, 2013, now Pat. No. 9,005,039.

(30) Foreign Application Priority Data

Jul. 12, 2012 (JP) .................................. 2012-156600

(51) Int. Cl.
*B23K 20/12* (2006.01)
*F16C 3/02* (2006.01)
*B23K 20/233* (2006.01)

(52) U.S. Cl.
CPC .............. *B23K 20/129* (2013.01); *B23K 20/12* (2013.01); *B23K 20/121* (2013.01); *B23K 20/122* (2013.01); *B23K 20/123* (2013.01);
(Continued)

(58) Field of Classification Search
None
See application file for complete search history.

(56) References Cited

U.S. PATENT DOCUMENTS 3,972,465 A * 8/1976 Takaoka ................. B23K 20/12
                                                    228/114.5
4,527,978 A * 7/1985 Zackrisson ............... F16C 3/02
                                                    464/182
(Continued)

FOREIGN PATENT DOCUMENTS

JP    57175091 A  * 10/1982
JP    58086994 A  *  5/1983
(Continued)

OTHER PUBLICATIONS

Japanese Office Action dated Aug. 4, 2015 (Six (6) pages).

(Continued)

*Primary Examiner* — Kiley Stoner
(74) *Attorney, Agent, or Firm* — Crowell & Moring LLP (57) ABSTRACT

An aluminum alloy propeller shaft including a tube made of an aluminum alloy, and a pair of yoke members made of an aluminum alloy, the yoke members including cylindrical base portions friction-welded to opposite end portions of the tube, each of the yoke members including a tip end portion having a pair of bearing retaining holes aligned with each other in a radial direction of the base portion. Variation in length between a central axis of the bearing retaining holes in one of the yoke members and a central axis of the bearing retaining holes in the other yoke member with respect to a reference length is set within a range of from +2.0 mm to −2.0 mm. A friction welding process of producing an aluminum alloy propeller shaft, including a friction step, a position displacement detection step, a rotation stop step and an upset step.

13 Claims, 5 Drawing Sheets (52) U.S. Cl.
CPC ............... *B23K20/2336* (2013.01); *F16C 3/02* (2013.01); *F16C 3/023* (2013.01); *B23K 2203/10* (2013.01)

(56) References Cited

U.S. PATENT DOCUMENTS

| | | | | |
|---|---|---|---|---|
| 4,581,816 A * | 4/1986 | Klufas | ................... | B23K 33/00 228/103 |
| 4,621,760 A * | 11/1986 | King | ................... | B23K 20/129 228/113 |
| 4,628,575 A * | 12/1986 | Klufas | ................... | B23K 33/00 228/103 |
| 4,711,008 A * | 12/1987 | Nakamura | ............... | B23P 15/00 228/112.1 |
| 4,915,536 A * | 4/1990 | Bear | ........................ | F16D 1/068 403/265 |
| 5,858,142 A | 1/1999 | Tully et al. | | |
| 6,105,849 A * | 8/2000 | Mochizuki | ............ | B23K 20/12 228/102 |
| 6,287,209 B1 * | 9/2001 | Nakajima | .................. | F16C 3/02 464/181 |
| 6,364,779 B1 * | 4/2002 | Duddy | ................... | B60K 17/22 464/182 |
| 2004/0238594 A1 * | 12/2004 | Juranitch | ................. | B21D 3/10 228/29 |
| 2006/0094515 A1 * | 5/2006 | Szuba | ..................... | F16D 3/387 464/134 |
| 2008/0058108 A1 * | 3/2008 | Lin | ......................... | F16D 3/387 464/134 |
| 2008/0182673 A1 * | 7/2008 | Habara | ................... | F16D 3/387 464/181 |
| 2008/0267549 A1 * | 10/2008 | Yamada | .................... | F16C 3/02 384/536 |
| 2009/0291765 A1 * | 11/2009 | Akita | ..................... | F16D 3/387 464/114 |
| 2010/0022317 A1 * | 1/2010 | Burgbacher | ......... | B23K 9/0282 464/178 |
| 2010/0062277 A1 * | 3/2010 | Sato | ......................... | C21D 1/28 428/586 |
| 2011/0143845 A1 * | 6/2011 | Ogawa | .................... | F16C 3/023 464/179 |
| 2011/0300954 A1 * | 12/2011 | Szuba | ..................... | F16D 3/387 464/106 |
| 2013/0053154 A1 * | 2/2013 | Yoshida | .................... | F16D 3/41 464/14 |
| 2013/0062396 A1 * | 3/2013 | Davenport | ........... | B23K 20/129 228/102 |
| 2013/0220798 A1 * | 8/2013 | Ando | ..................... | C23C 16/26 204/192.15 |
| 2014/0127423 A1 * | 5/2014 | Springer | ................. | F16C 3/023 427/541 |

FOREIGN PATENT DOCUMENTS

| | | | | |
|---|---|---|---|---|
| JP | 3-48113 U | 5/1991 | | |
| JP | 6-662 A | 1/1994 | | |
| JP | 7-9170 A | 1/1995 | | |
| JP | 11-156562 A | 6/1999 | | |
| JP | 2003065351 A * | 3/2003 | | |
| JP | 2003113831 A * | 4/2003 | | |
| JP | 2005-271015 A | 10/2005 | | |
| JP | 2007-296564 A | 11/2007 | | |
| JP | WO 2008010265 A1 * | 1/2008 | ........... | B23K 20/121 |
| JP | 5081153 B2 * | 11/2012 | ........... | B23K 20/121 |
| KR | 101004312 B1 * | 12/2010 | | |

OTHER PUBLICATIONS

English language abstract of previously submitted Japanese Patent Document 3-48113 U (one (1) page).

* cited by examiner

TABLE

|  | CONTROL SYSTEM | RANGE OF VARIATION IN LENGTH |
|---|---|---|
| EXPERIMENT 1 (COMPARATIVE) | TIMER CONTROL | ± 2.8mm |
| EXPERIMENT 2 | POSITION CONTROL (LA CONTROL) | ± 2.1mm |
| EXPERIMENT 3 | LA CONTROL + F2θ CONTROL | ± 1.2mm |

FIG.7

ALUMINUM ALLOY PROPELLER SHAFT AND FRICTION WELDING PROCESS THEREOF

CROSS REFERENCE

This application is a divisional of U.S. application Ser. No. 13/939,424, filed Jul. 11, 2013, which claims priority from Japanese Patent Application 2012-156600, filed on Jul. 12, 2012, now U.S. Pat. No. 9,005,039, the disclosures of which are expressly incorporated by reference herein.

BACKGROUND OF THE INVENTION

The present invention relates to an aluminum alloy propeller shaft as a power transmission device for a vehicle, and a friction welding process of the propeller shaft.

As is generally known, a method of bonding a tube of a vehicular propeller shaft and a yoke member to each other includes a friction welding process with high accuracy in addition to MIG or TIG welding.

In the friction welding process, a yoke member as one member is brought into friction contact with each of opposite ends of a tube as the other fixed member while being rotated through a main shaft. Then, in a preheat step, the members are pressed onto each other at a predetermined preheat pressure to thereby cause a temperature rise thereof up to a predetermined temperature value in order to obtain an amount of heat necessary for pressure welding the members. Subsequently, a rotation number and a friction pressure of the main shaft are set at predetermined values to heat a bonding interface between the members up to a temperature necessary for friction welding.

After that, in a stage in which the friction step is completed, the rotation of the main shaft is stopped and transition to an upset step is carried out with a preset upset delay time. In the upset step, by using an upset pressure, an oxide and a heat-softened portion present on the bonding interface between the members are removed as a flash to an outside, and solid-phase welding of fresh surfaces of the members is carried out. In a case where the upset pressure is low, removal of the oxide cannot be sufficiently attained. On the other hand, in a case where the upset pressure is high, there occurs plastic deformation or crack in the weld portion at which the members are welded to each other, thereby causing deterioration in welding quality. Therefore, the upset pressure is appropriately regulated in relation to the friction pressure.

Further, the preheat step and the friction step are managed by a timer, and carried out for a period of time from start of the preheat step to stop of rotation of the main shaft. The upset step is also managed by a timer, and carried out for a period of time which starts from the stop of rotation of the main shaft and terminates at a predetermined time. Within the upset time, upon a changeover from the friction pressure to the upset pressure, the upset delay time is set to control heat input to be applied to the members in the friction process and a heat influence range of the members, and transition to the upset step is carried out.

Japanese Patent Application Unexamined Publication No. H11-156562 A discloses such a friction welding process.

SUMMARY OF THE INVENTION

The aluminum alloy material has a heat radiation property higher than an iron material, and therefore, the welding must be completed within an extremely short time. In addition, if an amount of the heat input is large, the aluminum alloy material is heat-softened to cause reduction of a mechanical strength of the base metal of the aluminum alloy material. Further, since an upset distance variation rate of the aluminum alloy material is large, there is a fear that a change in value of the upset distance is caused due to variation in upset pressure timing, thereby deteriorating an accuracy in dimension of an overall length of the propeller shaft.

Further, in a case where the friction pressure and the upset pressure are managed by timers similarly to the above conventional art, variation in welding condition such as a rate of change in the upset distance will be readily caused due to variation in axial dimension of the yoke member and the tube and the like. As a result, as described above, particularly, variation in overall length dimension of the propeller shaft will be readily caused to thereby cause a technological problem such as deterioration of a yield of the propeller shaft.

The present invention has been made in view of the above-described problem in the conventional friction welding process. An object of the present invention is to provide an aluminum alloy propeller shaft capable of effectively suppressing variation in dimension of the overall length and a friction welding process of the propeller shaft.

In one aspect of the present invention, there is provided an aluminum alloy propeller shaft including:
a tube made of an aluminum alloy; and
a pair of yoke members made of an aluminum alloy, the pair of yoke members including cylindrical base portions butted against opposite end portions of the tube in an axial direction of the tube and friction-welded to the opposite end portions of the tube, each of the pair of yoke members including a bifurcate-shaped tip end portion having a pair of bearing retaining holes aligned with each other in a radial direction of the base portion,
wherein variation in length between a central axis of the bearing retaining holes formed in one of the pair of yoke members and a central axis of the bearing retaining holes formed in the other of the pair of yoke members with respect to a reference length is set within a range of from +2.0 mm to −2.0 mm.

In a further aspect of the present invention, there is provided a process of producing an aluminum alloy propeller shaft by friction welding, the aluminum alloy propeller shaft including a tube made of an aluminum alloy, and a pair of yoke members made of an aluminum alloy, each of the pair of yoke members including a cylindrical base portion butted against each of opposite end portions of the tube in an axial direction of the tube and bonded thereto, each of the pair of yoke members including a bifurcate-shaped tip end portion having a pair of bearing retaining holes aligned with each other in a radial direction of the base member, the process including:
a friction step of fixing one of the tube and the pair of yoke members, and pressing a tip end surface of each of the end portions of the tube and an end surface of the base portion of each of the pair of yoke members which is butted against the tip end surface of each of the end portions of the tube with a predetermined pressure welding force in the axial direction of the tube, while rotating the other of the tube and the pair of yoke members;
a position displacement detection step of detecting an amount of displacement of the tube and each of the pair of yoke members in the axial direction of the tube through an upset distance generated between the tube and each of the pair of yoke members in the friction step;
a rotation stop step of outputting a rotation stop signal to stop rotation of the other of the tube and the pair of yoke members when the amount of displacement detected in the position displacement detection step has reached a predetermined value; and an upset step of outputting an upset pressure command signal to press the other of the tube and the pair of yoke members onto the one of the tube and the pair of yoke members with an upset pressure larger than the predetermined pressure welding force used in the friction step to the pair of yoke members during a period of time for which the rotation of the other of the tube and the pair of yoke members is completely stopped after the rotation stop signal is outputted.

In a further aspect of the present invention, there is provided a process of producing an aluminum alloy propeller shaft by friction welding, the aluminum alloy propeller shaft including a tube made of an aluminum alloy, and a pair of yoke members made of an aluminum alloy, each of the pair of yoke members including a cylindrical base portion butted against each of opposite end portions of the tube in an axial direction of the tube and bonded thereto, each of the pair of yoke members including a bifurcate-shaped tip end portion having a pair of bearing retaining holes aligned with each other in a radial direction of the base member, the process including:

a friction step of fixing the tube, and pressing an end surface of the base portion of each of the pair of yoke members and a tip end surface of each of the end portions of the tube which is butted against the end surface of the base portion of each of the pair of yoke members with a predetermined pressure welding force in the axial direction of the tube, while rotating the pair of yoke members;

a position displacement detection step of detecting an amount of displacement of the tube and each of the pair of yoke members in the axial direction of the tube through an upset distance generated between the tube and each of the pair of yoke members in the friction step;

a rotation stop step of outputting a rotation stop signal to stop rotation of the pair of yoke members when the amount of displacement detected in the position displacement detection step has reached a predetermined value; and an upset step of outputting an upset pressure command signal to press the pair of yoke members onto the tube with an upset pressure after the rotation stop signal is outputted.

The present invention can attain an effect of effectively suppressing variation in length dimension of an aluminum alloy propeller shaft and enhancing a yield of the propeller shaft.

Other objects and features of this invention will become understood from the following description with reference to the accompanying drawings.

BRIEF DESCRIPTION OF THE DRAWINGS

FIGS. 2A-2G are diagrams showing steps of producing the aluminum alloy propeller shaft according to the embodiment of the present invention in which FIG. 2F shows a step of upsetting, FIG. 2G showing a step of resetting the friction welding machine to an initial position after completion of production of the propeller shaft.

DETAILED DESCRIPTION OF THE INVENTION

An aluminum alloy propeller shaft and a friction welding process of the propeller shaft according to an embodiment of the present invention will be explained hereinafter with reference to the accompanying drawings. In the embodiment, the propeller shaft is applied to a vehicle (an automobile), and disposed between a transmission and a differential gear of the vehicle.

Figure 1:
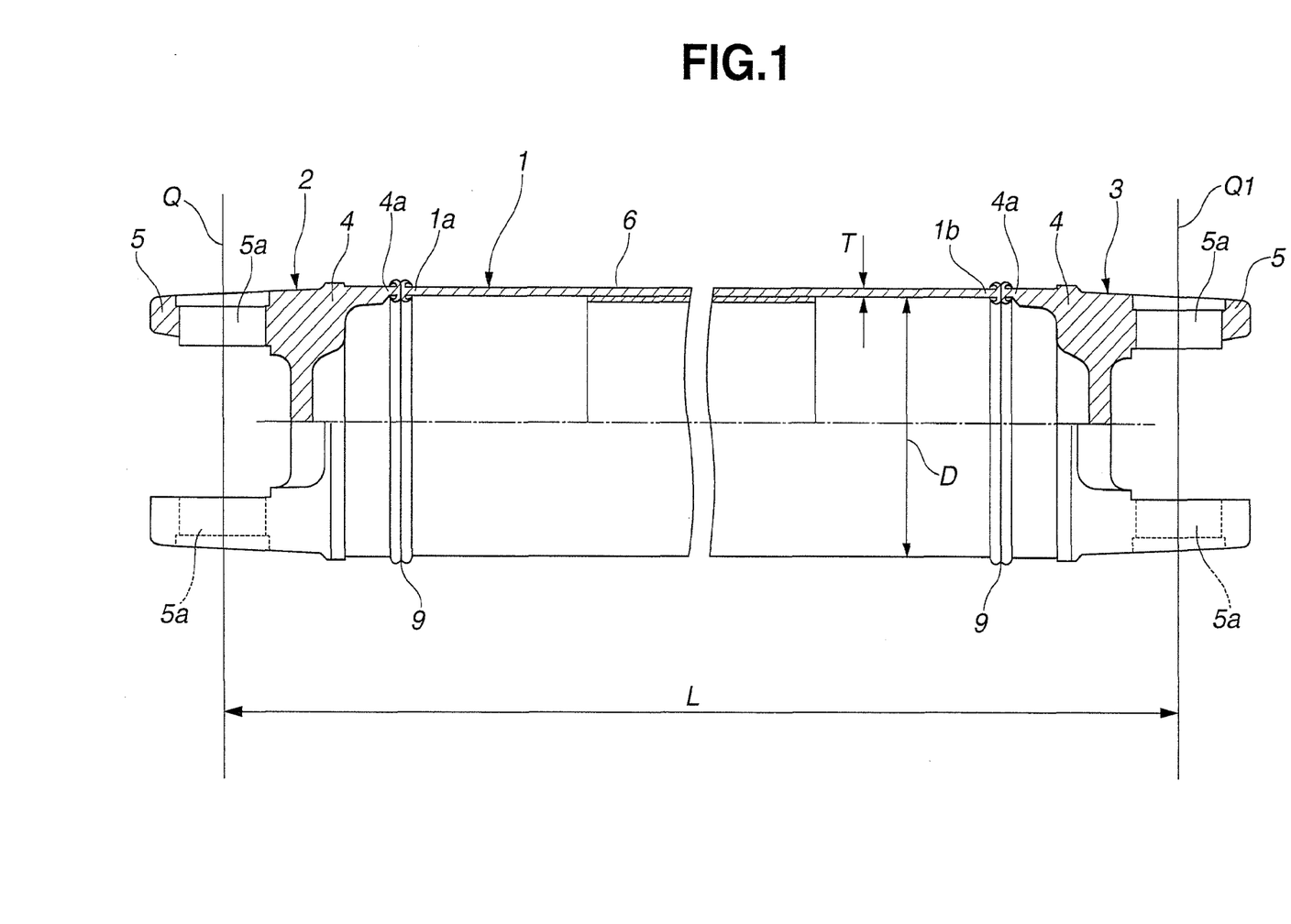
FIG. 1 is a partially sectional view of an aluminum alloy propeller shaft according to an embodiment of the present invention.

Referring to FIG. 1, there is shown a part of a vehicular propeller shaft according to an embodiment of the present invention. As shown in FIG. 1, the propeller shaft includes elongated cylindrical tube 1 that is disposed along a fore-and-aft direction of a vehicle body, and a pair of generally cylindrical yoke members 2, 3 respectively bonded to opposite end portions 1a, 1b of tube 1 in an axial direction of tube 1.

Specifically, tube 1 as a whole is made of an aluminum alloy material (for instance, T6, T8 treated 6000 series aluminum alloy) and formed into a cylindrical shape. A wall thickness T of tube 1 is set at, for instance, about 3 mm. An outer diameter D of tube 1 is set at a uniform value, for instance, 105 mm. Tube 1 has a smooth outer circumferential surface without serrations. Each of yoke members 2, 3 has bearing retaining holes 5a, 5a as explained later. An overall length (distance) L1 extending between central axis Q of bearing retaining holes 5a, 5a of yoke member 2 and central axis Q1 of bearing retaining holes 5a, 5a of yoke member 3 in the axial direction of tube 1 is set at a predetermined value, for instance, about 1200 mm. The overall length L1 is set to contain an upset distance provided for friction welding as explained later.

The pair of yoke members 2, 3 are made of an aluminum alloy material, and have the same outer diameter. Yoke members 2, 3 include cylindrical base portions 4, 4 respectively butted against end portions 1a, 1b of tube 1 in the axial direction of tube 1 and bonded to end portions 1a, 1b by the friction welding process. Yoke members 2, 3 also include bifurcated tip end portions 5, 5 respectively extending from base portions 4, 4 in an axial direction of yoke members 2, 3. A length of each of yoke members 2, 3 in the axial direction thereof is set to contain an upset distance provided for the friction welding as explained later.

Each of base portions 4, 4 is formed into a cylindrical shape having the same outer diameter as the outer diameter D of tube 1. A wall thickness of each of base portions 4, 4 is set to stepwise vary from a side of tip end portion 5 to end edge 4a on a side of tube 1, and be substantially the same as the wall thickness of tube 1 on a side of end edge 4a.

Each of bifurcated tip end portions 5, 5 is formed with a pair of bearing retaining holes 5a, 5a in a generally central position thereof which each serve to retain a bearing cup (not shown) provided on a spider of a spider joint (not shown). Each of bearing retaining holes 5a, 5a extends through tip end portion 5 in a radial direction of base portion 4. Bearing retaining holes 5a, 5a are opposed to each other in the radial direction of base portion 4 and aligned with each other to have the central axis Q (Q1) as shown in FIG. 1. Bearing retaining holes 5a, 5a have the same inner diameter.

In FIG. 1, reference numeral 6 denotes a damper member fixedly disposed in a generally middle position in the axial direction of tube 1 on an inner circumferential surface of tube 1.

One end portion 1a of tube 1 and base portion 4 of yoke member 2 are bonded to each other at mutually butting portions thereof in the axial direction of tube 1 by the friction welding process as explained later. Similarly, the other end portion 1b of tube 1 and base portion 4 of yoke member 3 are bonded to each other at mutually butting portions thereof in the axial direction of tube 1 by the friction welding process.

[Friction Welding Process by Friction Welding Machine]

The friction welding machine includes clamp mechanism 8 serving to clamp each of end portions 1a, 1b of tube 1, a rotation slide mechanism (a pressure applying mechanism) serving to rotate each of yoke members 2, 3 through a main shaft of a servomotor (not shown) and slide each of yoke members 2, 3 in the axial direction thereof, and a control unit that controls the rotation slide mechanism.

Figure 2A:
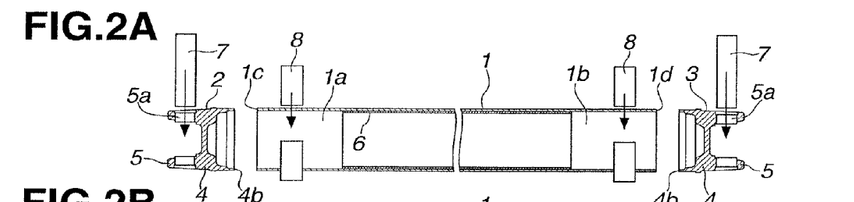
FIGS. 2A and 2B show a step of mounting a tube and yoke members to a friction welding machine.

The friction welding machine also includes a servo mechanism that serves to detect upset distances of tube 1 and yoke members 2, 3 which are generated during application of friction pressure. The upset distances as an amount of variation of the length L between the central axes Q, Q1 of bearing retaining holes 5a, 5a of left and right yoke members 2, 3 during application of friction pressure are determined as follows. Specifically, the detection of the left upset distance is performed by setting a butt position in which end surface 4b of base portion 4 of left yoke member 2 and tip end surface 1c of end portion 1a of tube 1 are butted against each other as left reference point S as shown in FIG. 2C, and detecting a position of the central axis Q of bearing retaining holes 5a, 5a of left yoke member 2 with respect to the left reference point S during application of friction pressure. Similarly, the detection of the right upset distance is performed by setting a butt position in which end surface 4b of base portion 4 of right yoke member 3 and tip end surface 1d of end portion 1b of tube 1 are butted against each other as right reference point S as shown in FIG. 2C, and detecting a position of the central axis Q1 of bearing retaining holes 5a, 5a of right yoke member 3 with respect to the right reference point S during application of friction pressure.

Figures 2C, 2D:
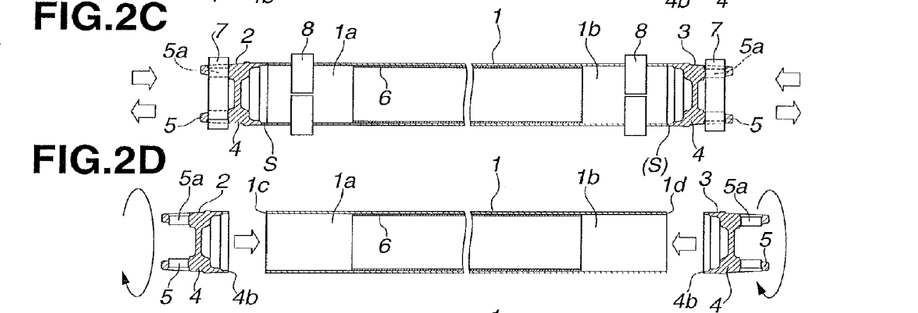
FIG. 2C shows a step of checking a length of a workpiece.
FIG. 2D shows a status of starting rotation of the yoke members.
Figure 3A:
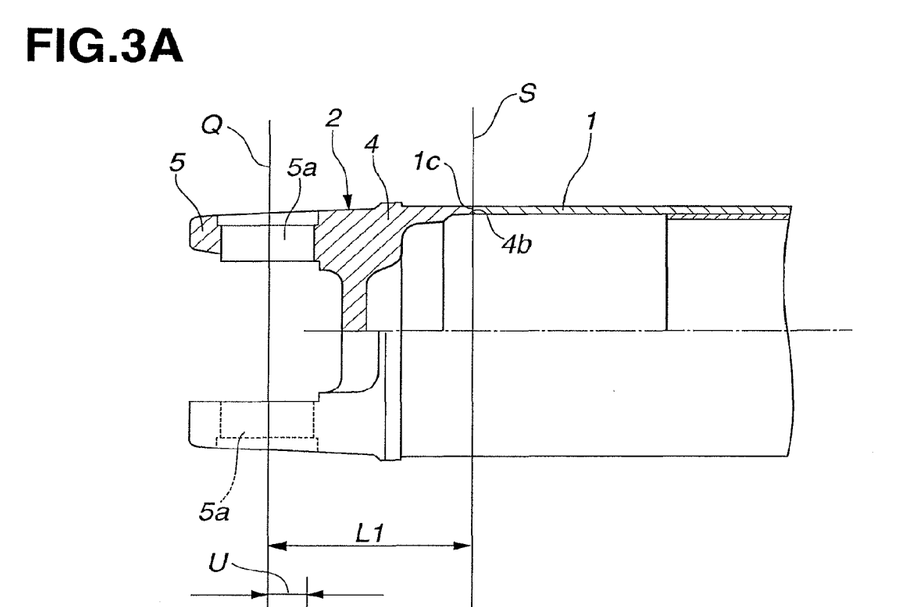
FIGS. 3A and 3B are explanatory diagrams showing a method of detecting an upset distance.
Figure 3B:
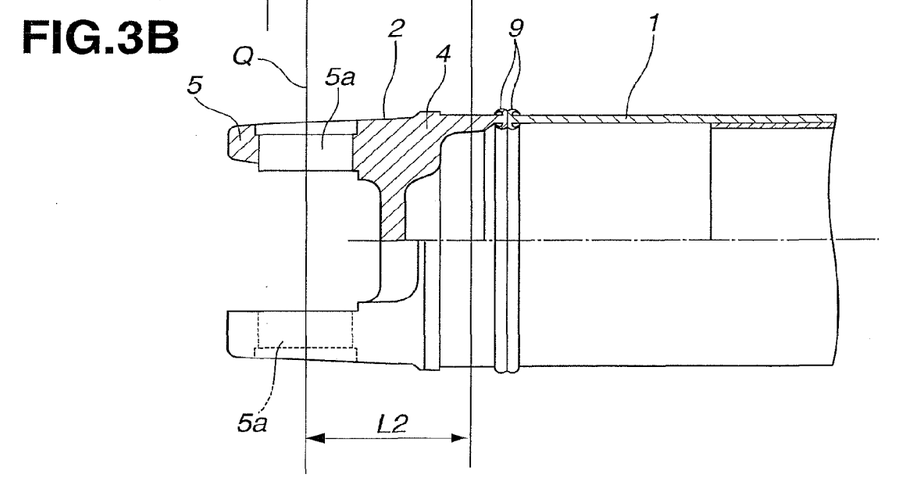

For instance, by referring to FIG. 2C and FIG. 3A, upset distance U of left yoke member 2 and tube 1 will be explained hereinafter. If a butt position in which left yoke member 2 and tube 1 are butted against each other before friction welding is defined as the left reference point S as shown in FIG. 2C, a length from the reference point S (line S as shown in FIG. 3A) to the central axis Q of bearing retaining holes 5a, 5a of left yoke member 2 before friction welding is indicated at L1 in FIG. 3A. On the other hand, as shown in FIG. 3B, a length from the left reference point S to the central axis Q of bearing retaining holes 5a, 5a of left yoke member 2 after the friction welding is indicated at L2, which is reduced due to curl 9 generated at the bonding portion of left yoke member 2 and tube 1 during the friction welding. A difference between the length L1 and the length L2 (i.e., a value obtained by subtracting L2 from L1) is defined as the upset distance U of left yoke member 2 and tube 1. Similarly, the upset distance U of right yoke member 3 and tube 1 is generated. A total upset distance is obtained as a sum of the upset distance U on the left side and the upset distance U on the right side.

The control unit controls rotation speed of each of the yoke members 2, 3, stop of rotation thereof and the like as well as a pressure welding force to be applied to each of the yoke members 2, 3 in the axial direction thereof through the rotation slide mechanism, and outputs an upset pressure command signal to the rotation slide mechanism on the basis of a position detection signal from the servomechanism.

Friction welding process using the above-described friction welding machine will be explained hereinafter. First, as shown in FIG. 2A, opposite end portions 1a, 1b of tube 1 are fixedly clamped by clamp mechanisms 8, 8. Each of base portions 4, 4 of yoke members 2, 3 is fixedly mounted to the main shaft so as to be axially aligned therewith by a yoke chuck (not shown) of the rotation slide mechanism.

Figure 2B:
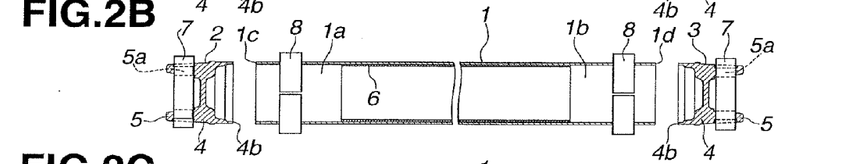

Next, as shown in FIG. 2A and FIG. 2B, race-hole pins 7, 7 are inserted into bearing retaining holes 5a, 5a and 5a, 5a of left and right yoke members 2, 3 in the radial direction of base portions 4, 4 of left and right yoke members 2, 3. With the arrangement of pins 7, 7, angular phases θ of left and right yoke members 2, 3 in a circumferential direction thereof with respect to tube 1 are previously set to be equivalent to each other.

Subsequently, as shown in FIG. 2C, left and right yoke members 2, 3 are allowed to move to be close to each other by the rotation slide mechanisms such that end surfaces 4b, 4b of base portions 4, 4 of left and right yoke members 2, 3 are butted against tip end surfaces 1c, 1d of end portions 1a, 1b of tube 1 in the axial direction thereof. With the butting arrangement, overall length L of the workpiece is checked, and the above-described reference points S, S are detected. After the overall length L of the workpiece is checked, that is, after the reference points S, S are detected, both yoke members 2, 3 are allowed to retreat to initial positions thereof Next, as shown in FIG. 2D, yoke members 2, 3 provisionally separated from tube 1 are allowed to rotate in the same direction through the main shafts of the rotation slide mechanisms. Rotation speeds of yoke members 2, 3 are controlled at predetermined value such that yoke members 2, 3 are rotated at substantially the same speed.

Figure 2E:
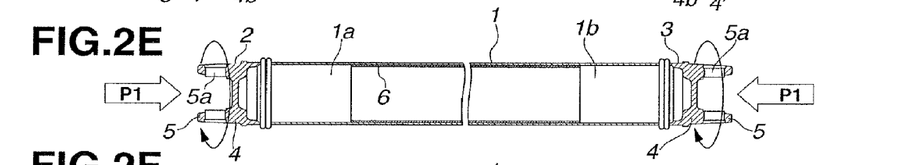
FIG. 2E shows a step of applying friction to the yoke members.

Subsequently, as shown in FIG. 2E, left and right yoke members 2, 3 in the rotating state are allowed to move toward end portions 1a, 1b of tube 1 by the rotation slide mechanisms. That is, end surfaces 4b, 4b of base portions 4, 4 of yoke members 2, 3 are allowed to abut against tip end surfaces 1c, 1d of end portions 1a, 1b of tube 1 in the axial direction thereof. At the same time, friction welding is carried out so that end surfaces 4b, 4b of base portions 4, 4 of yoke members 2, 3 are pressed against tip end surfaces 1c, 1d of end portions 1a, 1b of tube 1 with preheat pressure P0 and friction pressure P1 (friction step).

After that, the upset distances U owing to curls (burrs) 9 generated between respective end portions 1a, 1b of tube 1 and respective end edges 4a, 4a of base portions 4, 4 of left and right yoke members 2, 3 are detected on the basis of lengths between the respective central axes Q, Q1 of bearing retaining holes 5a, 5a and 5a, 5a of left and right yoke members 2, 3 and the corresponding reference points S, S. Specifically, as described above, an amount of displacement of the respective positions of the central axes Q, Q1 of bearing retaining holes 5a, 5a and 5a, 5a of left and right yoke members 2, 3 in the axial direction thereof with respect to the corresponding reference points S, S detected by the servomechanism in the step shown in FIG. 2C is detected to thereby detect the actual upset distances U (position displacement detection step).

Subsequently, when the upset distances U reach predetermined value as indicated at point LA shown in FIG. 4, the control unit outputs a main shaft rotation stop signal to stop the rotation of the main shaft to the electric motor (as indicated at M shown in FIG. 4), thereby stopping the rotation of both yoke members 2, 3 (rotation stop step).

Then, the main shafts are still rotated by several revolutions by inertia force during a period of time from the time (point M) at which the main shaft rotation stop signal is outputted to the time at which the rotation of the main shafts is completely stopped. When the rotation angle of the main shafts becomes predetermined rotation angle F2θ shown in FIG. 5 which is determined by back calculation of the rotation angle at which the rotation of the main shafts is completely stopped, the control unit outputs an upset pressure (P2) command signal to the rotation slide mechanisms (upset step).

The term "predetermined rotation angle (F2θ)" means a rotation angle at which a predetermined strength, for instance, static torsional strength, torsional fatigue strength, etc. can be obtained and fracture will occur not in a bonding interface between tube 1 and each of yoke members 2, 3 but in a heat softening portion produced by heat generated upon friction welding.

Figure 5:
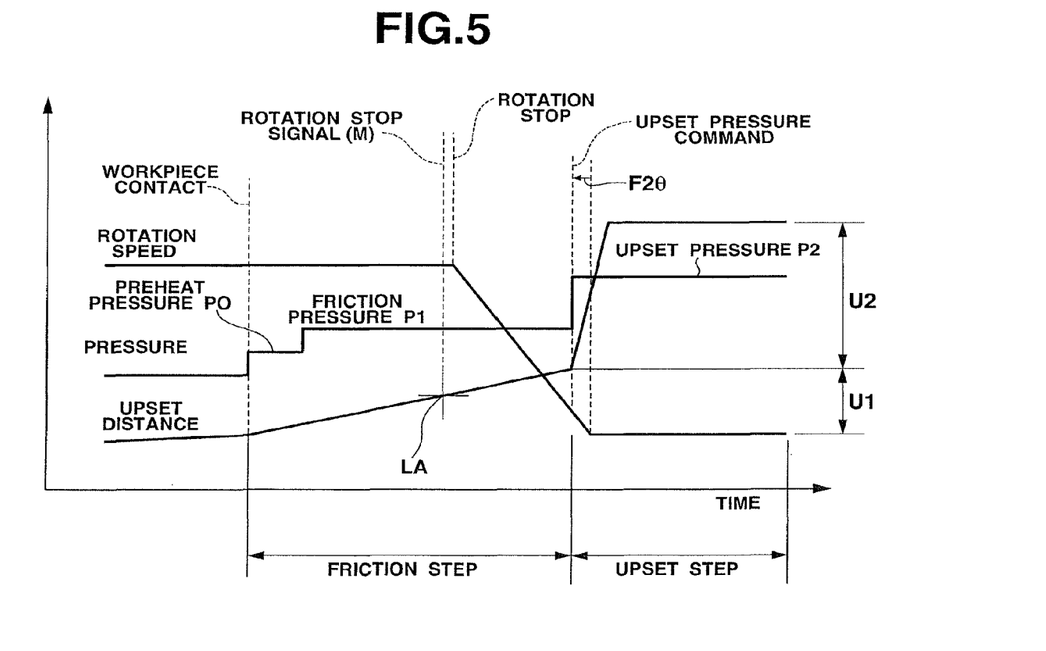
FIG. 5 is a control chart showing variations in parameters in Experiment 3 of the positional control and upset pressure timing delay control in the friction welding process according to the embodiment of the present invention.

The upset pressure P2 is a pressure larger than the friction pressure P1 in the above-described friction step, and is continuously applied until a predetermined period of time has elapsed from the time at which the rotation of the main shaft is completely stopped. By applying the upset pressure P2, as shown in FIG. 5, the amount of displacement of the respective positions of the central axes Q, Q1 with respect to the corresponding reference points S, S becomes larger and increases by the upset distance U2. The upset distance U2 produced by the upset pressure P2 is added to the upset distance U1 to thereby obtain total upset distance U (U=U1+U2). The total upset distance U obtained determines the final overall length L of tube 1 and yoke members 2, 3 bonded together by friction welding as shown in FIG. 1.

Further, as described above, at the time (point M) at which the main shaft rotation stop signal is outputted, simultaneously, yoke members 2, 3 are rotationally controlled by the rotation slide mechanism such that the angular phase of the central axis Q of bearing retaining holes 5a, 5a of yoke member 2 in the circumferential direction and the angular phase of the central axis Q1 of bearing retaining holes 5a, 5a of yoke member 3 in the circumferential direction are substantially equal to each other, and the difference in angular phase between the central axis Q and the central axis Q1 is within a range of from +3 degrees to −3 degrees.

Figures 2F, 2G:
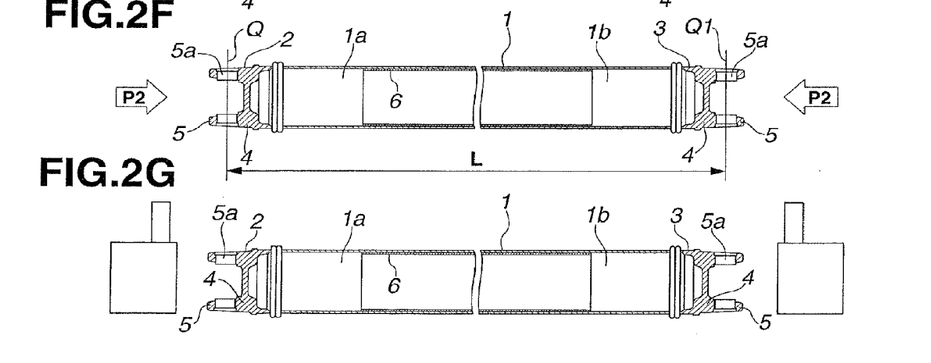

After that, as shown in FIG. 2G, each of the rotation slide mechanisms is operated to remove race-hole pin 7 from bearing retaining holes 5a, 5a of each of yoke members 2, 3 and retreat from yoke members 2, 3 to an initial position. Then, the produced propeller shaft is taken out, and a series of the sequential steps of the friction welding process is completed.

[Experiments Concerning Specific Control Chart]

In the following, Experiment (Comparative Experiment) 1 in which the timer control as proposed in the conventional art was carried out, Experiment 2 in which position control (LA control) according to the embodiment of the present invention was carried out, and Experiment 3 in which combination of the LA control and the rotation angle control (F2θ control) as described above was carried out, are explained.

Figure 4:
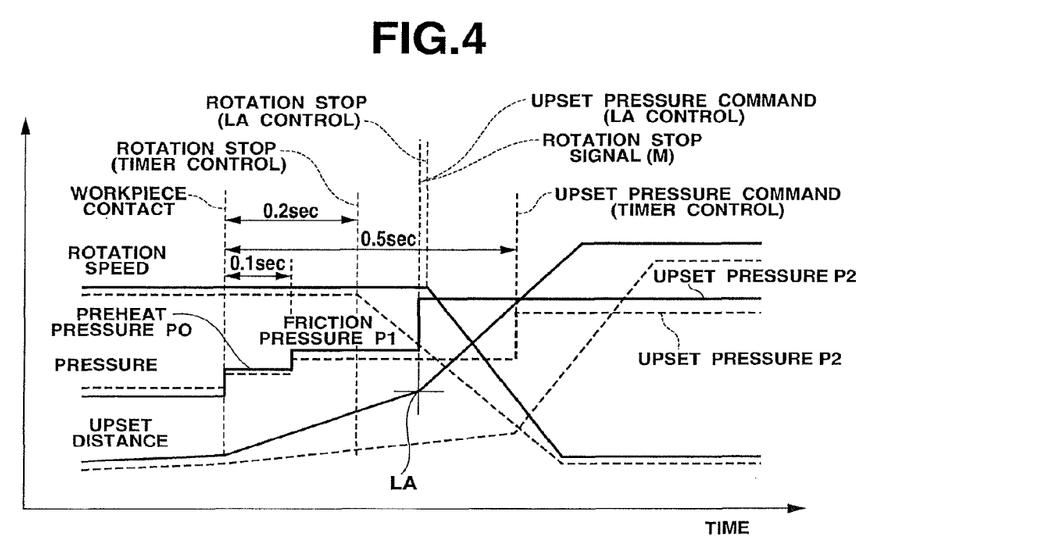
FIG. 4 is a control chart showing variations in parameters in Experiment (Comparative) 1 and Experiment 2 of positional control in a friction welding process according to the embodiment of the present invention in comparison to time control in the conventional friction welding process.

FIG. 4 shows a relationship between control timing and parameters such as pressure, upset distance, preheat pressure, and rotation speed of yoke members 2, 3 which was obtained in Experiment (Comparative Experiment) 1 and Experiment 2. In FIG. 4, Experiment (Comparative Experiment) 1 in which the timer control as proposed in the conventional art was carried out is indicated by broken line, and Experiment 2 in which the above-described position control (LA control) according to the embodiment of the present invention, that is, the control based on upset distances produced by friction pressure was carried out is indicated by solid line.

Experiment (Comparative Experiment) 1

Experiment (Comparative Experiment) 1 in which the timer control was carried out as indicated by the broken line in FIG. 4 was carried out as follows. After tube 1 and yoke members 2, 3 were set in the friction welding machine, yoke members 2, 3 were allowed to move toward and butt against opposite end portions 1a, 1b of tube 1 in the axial direction, respectively (namely, contact of the workpieces is carried out), while rotating the main shafts. At the same time, as indicated by the broken line in FIG. 4, application of preheat pressure at predetermined friction pressure P0 was started. Subsequently, at a time at which 0.1 second has elapsed from the time at which the contact of the workpieces was carried out, friction welding at friction pressure P1 was started.

At a time at which 0.2 second has elapsed from the time at which the contact of the workpieces was carried out, a main shaft rotation stop signal for stopping rotation of the main shaft was outputted. During a period of time from the time at which the contact of the workpieces was carried out to the time at which the rotation of the main shaft was completely stopped, that is, at a time at which 0.5 second has elapsed from the time at which the contact of the workpieces was carried out, an upset pressure command signal was outputted to apply upset pressure P2. Then, the application of the upset pressure P2 was continued until and after the rotation of the main shaft was completely stopped.

Experiment 2

Experiment 2 in which the position control (LA control) according to the embodiment of the present invention was carried out as follows. As indicated by solid line in FIG. 4, after application of the friction pressure P1 was started from the time at which the contact of the workpieces was carried out, current positions of the butting portions of tube 1 and yoke members 2, 3 in the axial direction thereof were detected. At a time at which actual upset distances of tube 1 and yoke members 2, 3 reached predetermined value LA, the main shaft rotation stop command signal was outputted, and at the same time, an upset pressure command signal was outputted to apply upset pressure P2. Then, the application of the upset pressure P2 was continued until a predetermined time has elapsed after the rotation of the main shaft was completely stopped.

Experiment 3

Experiment 3 in which the combination of the LA control and the F2θ control according to the embodiment of the present invention as shown in FIG. 2A to FIG. 2G was carried out as follows. FIG. 5 shows a relationship between control timing and parameters such as pressure, upset distance, preheat pressure, and rotation speed of yoke members 2, 3 which was obtained in Experiment 3. Similar to Experiment 2, after application of the friction pressure P1 was started from the time at which the contact of the workpieces was carried out, current positions of the butting portions of tube 1 and yoke members 2, 3 in the axial direction thereof were detected. At the time at which actual upset distances of tube 1 and yoke members 2, 3 reached the predetermined value LA, the main shaft rotation stop command signal was outputted.

After that, when rotation angle F2θ before the rotation of the main shaft was completely stopped had fallen in a predetermined range, the upset pressure command signal was outputted to apply the upset pressure P2 to the butting portion of tube 1 and yoke members 2. The predetermined range was set to the range of from 20% to 50% assuming that a phase variation of the main shaft which was made by several revolutions thereof until the rotation of the main shaft was completely stopped is defined as 100%.

That is, if the rotation angle F2θ is set to less than 20%, the upset distance U2 produced by the upset pressure P2 is reduced, thereby causing insufficient removal of the oxide and, therefore, causing expansion of a heat softening range in the bonding portion of tube 1 and each of yoke members 2, 3 which is produced upon friction welding. As a result, there will occur a lack of strength and an insufficient bonding state. In contrast, if the rotation angle F2θ is set to more than 50%, an absolute value of the upset distance U2 becomes larger, thereby causing an increased variation in length of tube 1 and yoke members 2, 3 bonded to each other by friction welding and a lack of accuracy of the overall length L thereof.

Figure 7:
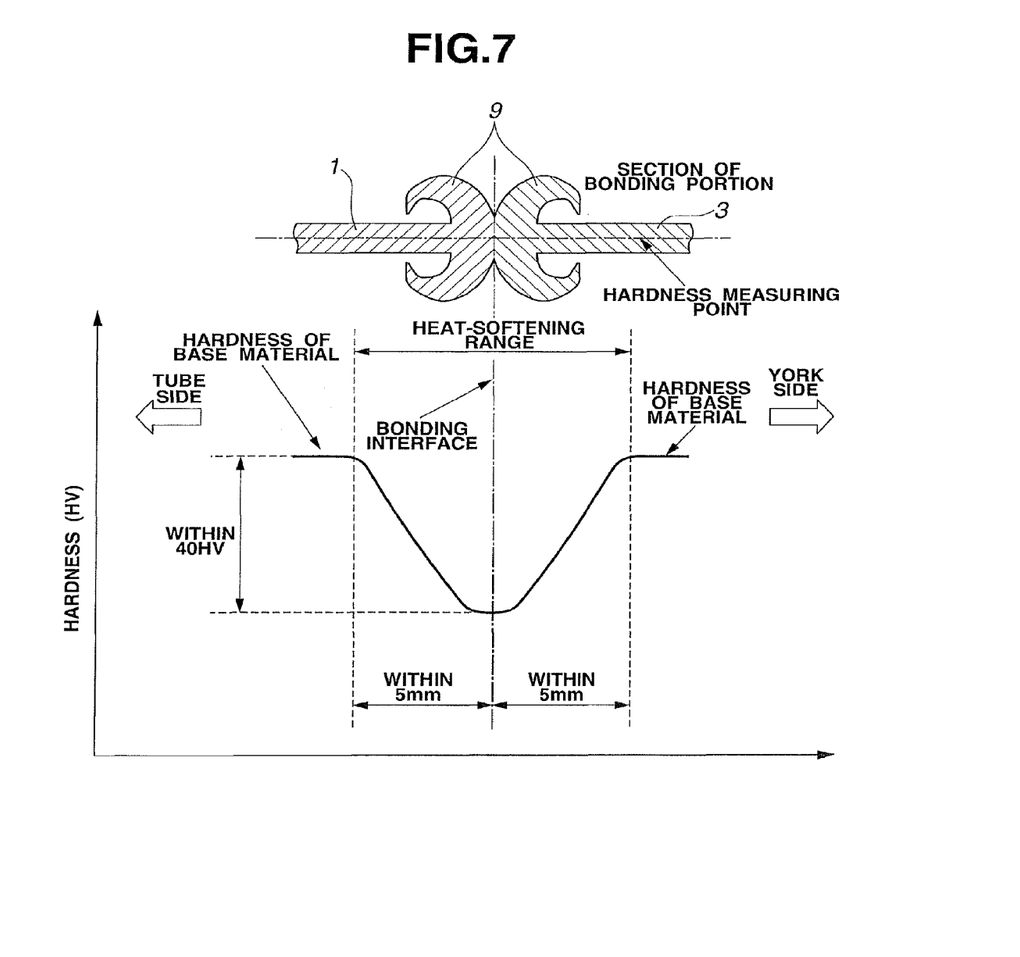
FIG. 7 is a graph showing hardness distribution in a heat softening range of a friction weld portion.

From the viewpoint of strength, there is a demand that the heat softening range in the bonding portion of tube 1 and each of yoke members 2, 3 is as small as possible and an amount of drop of a hardness of the heat softening range of the aluminum alloy propeller shaft on the basis of a hardness of a base material thereof is small. FIG. 7 shows a diagram of distribution of hardness in the bonding portion of tube 1 and yoke member 3. As shown in FIG. 7, the heat softening range extends from a bonding interface between tube 1 and yoke member 3 toward the side of tube 1 and the side of yoke member 3 within 5 mm. It was found that when the heat softening range was within 5 mm, the amount of drop of a hardness of the heat softening range of the aluminum alloy propeller shaft on the basis of a hardness of a base material thereof was within 40 HV. Accordingly, the rotation angle F2θ before complete stop of the rotation of the main shaft after the output of the main shaft rotation stop signal was set to the predetermined range of from 20% to 50% which serves to determine the heat softening range.

Further, in Experiment 3, the application of the upset pressure P2 was continued until the predetermined time has elapsed from the time at which rotation of the main shaft was completely stopped.

Further, in Experiment 3, at the time (point M) at which the main shaft rotation stop signal was outputted, simultaneously, yoke members 2, 3 were rotationally controlled such that the angular phase of the central axis Q of bearing retaining holes 5a, 5a of yoke member 2 in the circumferential direction and the angular phase of the central axis Q1 of bearing retaining holes 5a, 5a of yoke member 3 in the circumferential direction were substantially equal to each other, and the difference in angular phase between the central axis Q and the central axis Q1 was within a range of from +3 degrees to −3 degrees.

Figure 6:
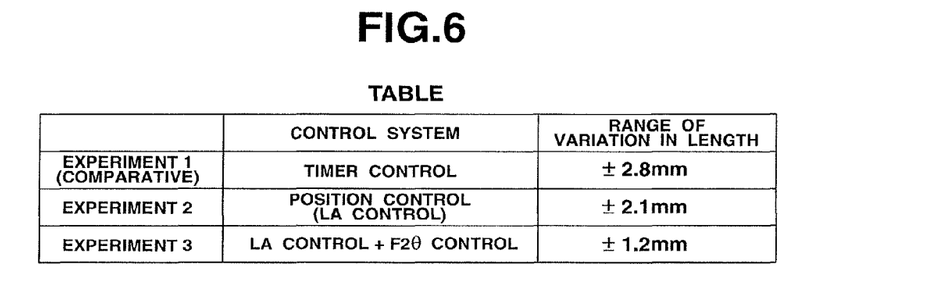
FIG. 6 is a table showing results of measurement obtained in the Experiments 1-3 of the friction welding process according to the embodiment of the present invention.

FIG. 6 shows results of measurement of a range of variation in the length between the central axis Q of bearing retaining holes 5a, 5a of yoke member 2 and the central axis Q1 of bearing retaining holes 5a, 5a of yoke member 3 with respect to a reference length which were obtained in Experiment (Comparative Experiment) 1 to Experiment 3. As shown in FIG. 6, in Experiment (Comparative Experiment) 1, variation in the length between central axes Q, Q1 with respect to the reference length was within the range of from +2.8 mm to −2.8 mm.

As shown in FIG. 6, in Experiment 2, variation in the length between central axes Q, Q1 with respect to the reference length was within the range of from +2.1 mm to −2.1 mm.

As shown in FIG. 6, in Experiment 3, variation in the length between central axes Q, Q1 with respect to the reference length was within the range of from +1.2 mm to −1.2 mm.

As described above, in Experiment (Comparative Experiment) 1 in which the timer control was carried out, variation in the length L between the central axis Q of bearing retaining holes 5a, 5a of yoke member 2 and the central axis Q1 of bearing retaining holes 5a, 5a of yoke member 3 as shown in FIG. 1 with respect to the reference length was within the range of from +2.8 mm to −2.8 mm. As a result, increased variation in overall length of the propeller shaft produced was caused to thereby considerably lower the yield.

Further, particularly, in Experiment (Comparative Experiment) 1, the output of the upset pressure signal command was managed with time. Therefore, there occurred variation in mechanical strength in the friction-welded portion which has a large influence on the upset distance.

Accordingly, in a case where the propeller shaft is produced by the timer control, deterioration in yield will be caused, resulting in an increased production cost thereof In Experiment 2, application of the upset pressure was started by the LA control. As a result, variation in the length L between the central axis Q of bearing retaining holes 5a, 5a of yoke member 2 and the central axis Q1 of bearing retaining holes 5a, 5a of yoke member 3 was able to be limited to the range of from +2.1 mm to −2.1 mm which was an allowable range of yield of the article.

In Experiment 3, in addition to the LA control, the timing of outputting the upset pressure command was controlled by the F2θ control such that the timing of starting application of the upset pressure P2 was delayed. Owing to the delay in timing of starting application of the upset pressure P2, variation in the length L between the central axis Q of bearing retaining holes 5a, 5a of yoke member 2 and the central axis Q1 of bearing retaining holes 5a, 5a of yoke member 3 with respect to the reference length was within the range of from +1.2 mm to −1.2 mm. Thus, the effect of considerably reducing the range of variation in the length L could be attained, thereby providing excellent yield of the propeller shaft and therefore serving to saving the production cost.

Further, the upset distance could be well controlled with high accuracy by the F2θ control, so that it was possible to attain ideal distribution of hardness in view of ensuring strength and enhance mechanical strength in the bonding portions of tube 1 and yoke members 2, 3.

That is, by adopting not only the LA control but also the F2θ control, variation in the length L between the central axis Q of bearing retaining holes 5a, 5a of yoke member 2 and the central axis Q1 of bearing retaining holes 5a, 5a of yoke member 3 with respect to the reference length could be limited to the range of from +1.2 mm to −1.2 mm. Therefore, static torsional strength as a strength of the respective bonding portions provided by friction welding could be sufficiently ensured so that the propeller shaft with high quality could be provided.

Further, if variation in the length L between the central axis Q of bearing retaining holes 5a, 5a of yoke member 2 and the central axis Q1 of bearing retaining holes 5a, 5a of yoke member 3 with respect to the reference length is within the range of from +2.0 mm to −2.0 mm, the propeller shaft can be mounted between a transmission and a differential gear of the vehicle while satisfying an allowable mounting length of the propeller shaft which is determined in consideration of dynamic behavior and dimensional variation of the vehicle.

Further, in Experiment 3, at the time (point M) at which the main shaft rotation stop signal was outputted, simultaneously, the difference in angular phase between the central axis Q of bearing retaining holes 5a, 5a of yoke member 2 and the central axis Q1 of bearing retaining holes 5a, 5a of yoke member 3 in the circumferential direction was controlled to lie within a range of from +3 degrees to −3 degrees by the phase alignment control. As a result, accuracy of the article can be enhanced to thereby serve to reduce the production cost.

In addition, in the process according to the embodiment of the present invention, race-hole pins 7, 7 can be smoothly removed from bearing retaining holes 5a, 5a and 5a, 5a of yoke members 2, 3. Further, it is possible to enhance accuracy of mounting a bearing cup of a spider of a spider joint which is retained in each pair of bearing retaining holes 5a, 5a and 5a, 5a.

The present invention is not limited to the above-described embodiment. For instance, in accordance with modification of the construction such as the length and the outer diameter of the propeller shaft, the value LA of the upset distance at which the LA control is carried out can be optionally set, and the timing of outputting of the upset pressure command signal, i.e., the value of F2θ can be optionally set.

Further, the propeller shaft of the present invention can be applied to a shipboard other than an automobile.

This application is based on a prior Japanese Patent Application No. 2012-156600 filed on Jul. 12, 2012. The entire contents of the Japanese Patent Application No. 2012-156600 are hereby incorporated by reference.

Although the invention has been described above by reference to a certain embodiment of the invention and modifications of the embodiment, the invention is not limited to the embodiment and modifications described above. Further variations of the embodiment and modifications described above will occur to those skilled in the art in light of the above teachings. The scope of the invention is defined with reference to the following claims.

What is claimed is:

1. A process of producing an aluminum alloy propeller shaft by friction welding, the aluminum alloy propeller shaft comprising a tube made of an aluminum alloy, and a pair of yoke members made of an aluminum alloy, each of the pair of yoke members comprising a cylindrical base portion butted against each of opposite end portions of the tube in an axial direction of the tube and bonded thereto, each of the pair of yoke members comprising a bifurcate-shaped tip end portion having a pair of bearing retaining holes aligned with each other in a radial direction of the base member, the process comprising:

a friction step of fixing one of the tube and the pair of yoke members, and pressing a tip end surface of each of the end portions of the tube and an end surface of the base portion of each of the pair of yoke members which is butted against the tip end surface of each of the end portions of the tube with a predetermined pressure welding force in the axial direction of the tube, while rotating the other of the tube and the pair of yoke members;

a position displacement detection step of detecting an amount of displacement of the tube and each of the pair of yoke members in the axial direction of the tube through an upset distance generated between the tube and each of the pair of yoke members in the friction step;

a rotation stop step of outputting a rotation stop signal to stop rotation of the other of the tube and the pair of yoke members when the amount of displacement detected in the position displacement detection step has reached a predetermined value; and an upset step of outputting an upset pressure command signal to press the other of the tube and the pair of yoke members onto the one of the tube and the pair of yoke members with an upset pressure larger than the predetermined pressure welding force used in the friction step to the pair of yoke members during a period of time for which the rotation of the other of the tube and the pair of yoke members is completely stopped after the rotation stop signal is outputted;

wherein the rotation stop step comprises calculating a rotation angle of the other of the tube and the pair of yoke members at which the rotation of the other of the tube and the pair of yoke members is completely stopped.

2. The process of producing an aluminum alloy propeller shaft by friction welding as claimed in claim 1, wherein the upset step comprises starting application of the upset pressure before the time calculated is reached.

3. The process of producing an aluminum alloy propeller shaft by friction welding as claimed in claim 2, wherein the upset step comprises continuing the application of the upset pressure for a predetermined time after the rotation of the other of the tube and the pair of yoke members is completely stopped.

4. The process of producing an aluminum alloy propeller shaft by friction welding as claimed in claim 1, wherein the upset pressure is applied by outputting the upset pressure command signal when a rotation angle of the other of the tube and the pair of yoke members before the rotation thereof is completely stopped has fallen in a predetermined range that is determined assuming that a phase variation of the other of the tube and the pair of yoke members which is made until the rotation of the other of the tube and the pair of yoke members is defined as 100%.

5. The process of producing an aluminum alloy propeller shaft by friction welding as claimed in claim 4, wherein the predetermined range is from 20% to 50%.

6. The process of producing an aluminum alloy propeller shaft by friction welding as claimed in claim 1, further comprising a reference point setting step of butting the pair of yoke members against the end portions of the tube and setting a butt position where the end surface of each of the pair of yoke members and the tip end surface of each of the opposite end portions of the tube are butted against each other as a reference point, the reference point setting step being carried out before the friction step.

7. The process of producing an aluminum alloy propeller shaft by friction welding as claimed in claim 6, wherein in the friction step, the other of the tube and the pair of yoke members is each of the pair of yoke members.

8. The process of producing an aluminum alloy propeller shaft by friction welding as claimed in claim 7, wherein the pair of yoke members are controlled to rotate at substantially same speed.

9. The process of producing an aluminum alloy propeller shaft by friction welding as claimed in claim 2, wherein the position displacement step comprises detecting the upset distance based on a length from the set reference point to a central axis of the pair of bearing retaining holes of each of the pair of yoke members.

10. A process of producing an aluminum alloy propeller shaft by friction welding, the aluminum alloy propeller shaft comprising a tube made of an aluminum alloy, and a pair of yoke members made of an aluminum alloy, each of the pair of yoke members comprising a cylindrical base portion butted against each of opposite end portions of the tube in an axial direction of the tube and bonded thereto, each of the pair of yoke members comprising a bifurcate-shaped tip end portion having a pair of bearing retaining holes aligned with each other in a radial direction of the base member, the process comprising:

- a friction step of fixing the tube, and pressing an end surface of the base portion of each of the pair of yoke members and a tip end surface of each of the end portions of the tube which is butted against the end surface of the base portion of each of the pair of yoke members with a predetermined pressure welding force in the axial direction of the tube, while rotating the pair of yoke members;
- a position displacement detection step of detecting an amount of displacement of the tube and each of the pair of yoke members in the axial direction of the tube through an upset distance generated between the tube and each of the pair of yoke members in the friction step;
- a rotation stop step of outputting a rotation stop signal to stop rotation of the pair of yoke members when the amount of displacement detected in the position displacement detection step has reached a predetermined value; and
- an upset step of outputting an upset pressure command signal to press the pair of yoke members onto the tube with an upset pressure after the rotation stop signal is outputted;

wherein the rotation stop step comprises calculating a rotation angle of the pair of yoke members at which the rotation of the pair of yoke members is completely stopped.

11. The process of producing an aluminum alloy propeller shaft by friction welding as claimed in claim 10, wherein in the upset step, the pair of yoke members are pressed onto the tube with the upset pressure larger than the predetermined pressure welding force used in the friction step, and the pressing operation is started before rotation of the pair of yoke members is completely stopped.

12. The process of producing an aluminum alloy propeller shaft by friction welding as claimed in claim 10, wherein the pair of yoke members are simultaneously friction-welded.

13. The process of producing an aluminum alloy propeller shaft by friction welding as claimed in claim 10, wherein the upset step comprises starting application of the upset pressure before the time calculated is reached.

* * * * *